United States Patent Office 3,391,127
Patented July 2, 1968

3,391,127
METAL COMPLEXES OF POLYSECONDARY
AMINES AND FILMS THEREFROM
Marwan R. Kamal, Minneapolis, Minn., assignor to
General Mills, Inc., a corporation of Delaware
No Drawing. Filed Dec. 23, 1963, Ser. No. 332,924
21 Claims. (Cl. 260—78.4)

The instant invention relates to certain new metal complexes of polysecondary amines, liquid film forming solutions thereof, and methods of preparing and using the same, particularly in the formation of heat-resistant films.

Although metal complexes of a chelate nature with organic nitrogen compounds have been formed and recognized hereinbefore as metal complexes, via a process of the so-called "Werner Complex Formation," these compounds have ordinarily been formed only as infusible, insoluble solids in most instances and are thus quite difficut to handle and use in any practical way. The instant invention, however, contemplates the formation of an initial liquid metal complex of a polysecondary amine and/or liquid solution of such complex in a volatile organic solvent, such that the same is stable under the conventional conditions of storage, while being usable for filming or in other conventional uses for the application of a film or coating of such complex (with or without a solvent) which may then be heat cured to obtain a highly desirable insoluble, infusible and adherent heat-stable film.

It is, therefore, an important object of the instant invention to provide improved metal complexes and compositions containing the same, and methods of preparing and using the same.

Other and further objects, features and advantages of the present invention will become apparent to those skilled in the art from the following detailed disclosure thereof, including the examples hereof.

One important aspect of the instant invention, in general, consists in a new substance, which is a metal complex of a polymer having the recurring structural unit:

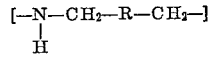

wherein R is a dimeric fat radical.

The polymeric materials used in the practice of the instant invention to form the metal complexes are essentially polysecondary amines.

Such polymers useful in the present invention (ordinarily have at least one and possibly two terminal primary amino groups, but) are characterized by the recurring structural unit:

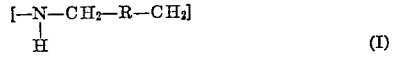    (I)

wherein R is a dimeric fat radical. These polymers are conveniently prepared by the condensation polymerization of a fatty dinitrile derived from a dimerized fat acid. In addition to the homopolymer products prepared by the homo-condensation of a fatty dinitrile, copolymer products can be prepared by the condensation copolymerization of a fatty dinitrile and a dinitrile copolymerizable therewith.

The condensation polymerization of the fatty dinitriles is accomplished by hydrogenating a fatty dinitrile under secondary-amine-forming conditions. By "secondary-amine-forming conditions" is meant that set of hydrogenation conditions under which a fatty nitrile preferentially forms a secondary amine rather than a primary amine. Secondary fatty amines are commercially available products and the conditions necessary to produce them are well understood in the art. Typical reaction conditions utilize hydrozen pressures in the range of 25 to 1000 p.s.i.g. at temperatures in the range of 200 to 290° C.

The preparative reaction is illustrated by the following Equation A:

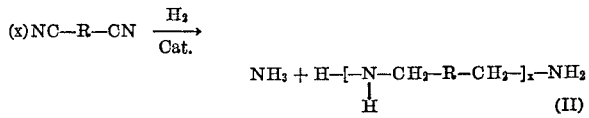

where R is a dimeric fat radical and $x$ is the number of recurring units in the polymeric chain. As illustrated in the equation, an ammonia by-product is formed. In order to obtain optimum yields of the desired polymer product, the ammonia by-product should be removed. Generally this is done by "sweeping" the reaction mixture with hydrogen gas.

Depending on the reaction conditions employed, the polymer products will vary in molecular weight from dimers in which $x$ in the foregoing Equation A is 2, to high molecular weight products in which $x$ is 40 or greater. The molecular weight of the polymer product can be varied by selection of the reaction conditions. Mild reaction conditions tend to produce lower molecular weight polymers while extremely severe reaction conditions produce insoluble cross-linked polymers. The lower molecular weight polymers are readily pourable, viscous liquids which resemble a heavy syrup. They are generally pale amber in color and are readily soluble in most common organic solvents. As the molecular weight increases, the products are generally more viscous, less soluble and darker in color. Products in which $x$ is about 20 are extremely viscous and are difficult to pour even when heated.

A hydrogenation catalyst is employed to carry out the reaction of the present invention. Generally, any nitrile hydrogenation catalyst can be employed. The preferred catalysts are Raney nickel and copper-chromite catalysts. Other suitable catalysts include Raney cobalt, platinum, palladium, palladium on charcoal, platinum on charcoal, nickel on kieselguhr, copper-nickel carbonate, cadmium-copper-zinc chromite, copper-nickel oxide, and the like.

The "copper-chromite catalyst" referred to above is often referred to as "copper-chromium oxide catalyst." Preparation of copper-chromite catalysts is discussed in an article by Connor, Folkers, and Adkins, in the "Journal of the American Chemical Society," vol. 54, pages 138–45 (1932) and in "Reactions of Hydrogen with Organic Compounds over Copper-Chromium Oxide and Nickel Catalysts" by Homer Adkins, University of Wisconsin Press, Madison, Wis. (1937). The nature of this catalyst is further discussed in an article by Adkins, Burgoyne, and Schneider in the Journal of the American Chemical Society, vol. 72, pages 2226–29 (1950). Commercially available copper-chromite catalysts often contain amounts of catalyst stabilizers, e.g., barium oxide, calcium oxide, and magnesium oxide. Catalysts containing such stabilizers can be employed in the instant invention if desired. While many types of copper-chromite catalysts are commercially available and are generally useful in the instant invention, it is preferred to employ a catalyst containing 40 to 65% CuO (assuming all copper is present as CuO) and 35 to 60% $Cr_2O_3$ (assuming all chromium to be present as $Cr_2O_3$).

The amount of catalyst employed is not critical. However, the molecular weight and other properties of the polymer product will vary depending on the amount and type of catalyst used. Generally, catalyst in the amount of 1 to 10% by weight, based on the weight of the nitrile charge, is sufficient for most purposes. Larger and smaller amounts of catalysts can be employed if desired.

The dinitrile starting materials for preparing the polymers of the present invention are the dinitriles prepared from dimerized fat acids. Relatively pure dimerized fat acids can be distilled from commercially available polymeric fat acids mixtures. The term "polymeric fat radical" as used herein refers to the hydrocarbon radical of a polymeric fat acid. The term "polymeric fat acid" referes to a polymerized fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically fat acids are generally polymerized by somewhat different techniques, but because of the functional similarity of the polymerization products, they are generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commerically significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acd.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthroquinone, sulfur dioxide and the like. Suitable monomers include the branched straight chain, poly and monoethylenically unsaturated acids such as 3-octenoic acid, 11-dodecenoic acid, linderic acid, lauroleic myristoleic acid, tsuznic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, trimnodonic acid, eicosatetraenoic acid, nisinic acid, scoliodonic acid and chaulmoogic acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid, and isomic acid.

Because of ther ready availability and relative ease of polymerization, oleic and linoleic acid are the preferred starting materials for the preparation of the polymeric fat acids.

The dimerized fat acid is then converted to the corresponding dinitriles by reacting the dimerized fat acid with ammonia under nitrile forming conditions. The details of this reaction are set forth in chapter 2 of "Fatty Acids and Their Derivatives" by A. W. Raison, John Wiley & Sons, Inc., New York (1948). If desired, the dinitrile may then be purified to the desired degree by vacuum distillation or other suitable means. Generally, the high purity dinitrile tends to produce linear polymers of high molecular weight. If appreciable amounts of mononitrile are present, the polymer will be of low molecular weight, since these materials act as chain-stoppers. The presence of trinitriles and other higher polyfunctional nitriles tends to produce a cross-linked polymer. A sufficient amount of trinitriles will provide a gelled product.

Copolymers can be prepared by copolymerizing mixtures of dinitriles. The desired dinitrile comonomer is added to the reaction mixture along with the fatty dinitrile. After subjecting the mixture to polymerization conditions, there is obtained a copolymer having randomly distributed recurring units:

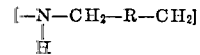

(III)

and

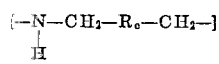

(IV)

where R is a dimeric fat radical and $R_c$ is a divalent radical derived from the comonomer dinitrile. Generally, any copolymerizable dinitrile can be employed. Specific examples of simple nitriles which can be employed as comonomers include the dinitriles derived from such acids as adipic acid, pimelic acid, suberic acid, azelaic acid, and sebacic acid (e.g., wherein $R_c$ is a $C_4$-$C_{22}$ polymethylene group). Mixtures of two or more fatty dinitriles can also be copolymerized. A large variety of other dinitriles are likewise useful.

In theory, the formation of the polymeric amine proceeds through the preliminary reduction of the nitrile to the primary amine followed by conversion of the primary amine to the polymeric secondary amine. Accordingly, this provides an alternate route for the preparation of the polymers. In the alternate route, the polyamines (i.e., $H_2N$—$CH_2HCH_2NH_2$ hereof) are formed separately and then converted to the polymeric amines under the conditions previously described, although it is possible to use somewhat milder conditions. In this instance, it is possible to use a variety of other polyamines as comonomers including some comonomers such as metaxylylene diamines which may not be readily employed in the form of nitriles.

From a practical standpoint, there may be certain advantages in thus carrying out the preparation of the polymeric amines in two steps since it makes possible the removal of any by-products formed in the first step, i.e., the formation of the primary amine and thus enhances the purity of the final product.

Generally, the end groups of the polymers of the present invention will be either amine groups or nitrile groups. Where the polymers are prepared by condensing amines, all the end groups will be primary amines:

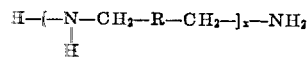

(II)

where R and $x$ are as previously defined. Where a dinitrile is used as the starting material and the reaction conditions are mild and the reaction time is short, the end groups will be mainly nitrile groups;

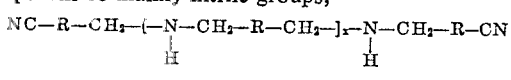

(VI)

wherein R and $x$ are as previously defined. When dinitriles are used as the starting material, under many reaction conditions a mixture of polymers will be obtained, some chains terminating in nitrile groups and other chains terminating in (primary) amine groups. Where severe reaction conditions are utilized, the degradation of functional groups may cause some chains to terminate in hydrocarbon groups.

The invention will be better understood with respect to the following examples which illustrate certain preferred embodiments of the present invention. Unless otherwise specified, all parts and percentages used herein are by weight.

EXAMPLE 1

Into a 1 liter stirred autoclave were charged 417 grams of distilled dimer nitrile prepared from dimerized linoleic acid and 10 grams of water-wet Raney nickel catalyst. The autoclave was flushed with hydrogen, sealed under 150 p.s.i.g. hydrogen and rapidly heated to 200° C., at which time a continuous venting of hydrogen was begun such that the hydrogen coming into the autoclave was at 240 p.s.i. and the actual pressure in the autoclave was approximately 230 p.s.i. Heating was continued until the desired reaction temperature of 270° C. was reached. The hydrogenation was continued at this temperature for a period of 1⅓ hours. The reaction mixture was then cooled to below 200° C. and the catalyst was filtered off. There was obtained a product having a Brookfield viscosity of 114 poises at 25° C., a molecular weight of 4600 and an inherent viscosity of 0.165 as measured on a 0.5% solution in meta-cresol. Infrared analysis indicated that no nitrile groups were left in the product. The product contained 12.4% primary amine groups, 72.7% secondary amine groups, and 5.5% tertiary amine groups.

EXAMPLE II

Example I was repeated except 21 grams of a commercially available copper-chromite catalyst "G–13," manufactured by The Girdler Company of Louisville, Ky., was substituted for the Raney nickel catalyst of Example I. There was obtained a product having a Brookfield viscosity of 4220 poises at 25° C., a molecular weight of 10,100 and an inherent viscosity of 0.262 as measured on a 0.5% solution in meta-cresol. The product contained 8.0% primary amine groups, 84.4% secondary amine groups, 5.1% tertiary amine groups, and no nitrile groups.

EXAMPLE III

Example II was repeated except that the reaction was run at 250° C., for a period of 5⅓ hours. There was obtained a product having a Brookfield viscosity of 6200 poises at 25° C., a molecular weight of 11,000, and an inherent visocisity of 0.3335 as measured on a 0.5% solution in meta-cresol. The product contained 6.5% primary amine groups, 85.9% secondary amine groups, 5.7% tertiary amine groups, and no nitrile groups.

EXAMPLE IV

Example II was repeated except that the reaction time was increased to 2 hours. There was obtained a product having a Brookfield viscosity of greater than 20,000 poises at 25° C., a Brookfield viscosity of 6400 poises at 60° C., a molecular weight of 9900, and an inherent viscosity of 0.334 as measured on a 0.5% solution in meta-cresol. The product contained 7.0% primary amine groups, 81.4% secondary amine groups, 7.6% tertiary amine groups, and no nitrile groups.

EXAMPLE V

Into a 1 liter stirred autoclave were chrged 400 grams of crude undistilled dimer nitrile prepared from vacuum stripped dimerized linoleic acid, and 100 grams monomer nitrile prepared from the recovered monomeric acid obtained from the polymerization of linoleic acid, and 25 grams of copper-chromite of Example II. After hydrogenation at 280° C. for 1⅓ hours, there was obtained a product having a Brookfield viscosity of 241 poises at 25° C., 6.9% primary amine groups, 81.2% secondary amine groups, 5.6% tertiary amine groups, and 2.8% nitrile groups.

EXAMPLE VI

A crude undistilled dimer nitrile prepared from vacuum stripped dimerized linoleic acid was treated with a mixture of copper-chromite catalyst recovered from the reaction mixture of a previous successful hydrogenation and diatomaceous earth. The level of catalyst used in this pre-treatment was about 5% by weight, based on the nitrile. The dimer nitrile was recovered by filtration. Into a 1 liter stirred autoclave were charged 442 grams of the treated dimer nitrile and 21 grams of the copper-chromite catalyst of Example II. After hydrogenation at 280° C. for 1⅓ hours, there was obtained a product having 9.2% primary amine groups, 71.9% secondary amine groups, 5.8% tertiary amine groups, and 5.6% nitrile groups. The product had a Brookfield viscosity of 639 poises at 25° C. and a molecular weight of 4200.

EXAMPLE VII

A crude undistilled dimer nitrile perepared from vacuum stripped dimerized linoleic acid was washed with 1.5 grams of sodium hydroxide which had been dissolved in ethanol. After separating the solutions, 400 grams of the treated dimer nitrile and 20 grams of the copper-chromite catalyst of Example II were charged into 1 liter autoclave. After hydrogenation at 280° C. for 1½ hours there was obtained a product having a molecular weight of 3000, a Brookfield viscosity at 25° C. of greater than 20,000 poises and a Brookfield viscosity at 60° C. of 1,260 poises. Analysis of the product indicated that it had 15.8% primary amine groups, 60.7% secondary amine groups, 9.4% tertiary amine groups, and no nitrile groups.

EXAMPLE VIII

Into a 1 liter stirred autoclave were charged 530 grams of a distilled dimer nitrile having an iodine value of 8.5 prepared from a distilled dimer acid essentially saturated by hydrogenation having an iodine value of 8.4 and 25 grams of the copper-chromite catalyst of Example II. After hydrogenation for 3 hours at 270° C. there was obtained a product having an apparent molecular weight of 5,800, an iodine value of 10.3, a Brookfield viscosity of greater than 20,000 poises at 25° C., and a Brookfield viscosity of 2,240 poises at 60° C. The product contained 9.6% primary amine groups, 76.7% secondary amine groups, 5.4% tertiary amine groups, and no nitrile groups.

EXAMPLE IX

Example VIII was repeated except that 9.6 grams of methanol-wet Raney nickel was used as a catalyst for 400 grams of nitrile. After hydrogenation at 270° C. for 1⅓ hours, there was obtained a gelled product.

EXAMPLE X

Into a 1 linter stirred autoclave were charged 405 grams of distilled dimer nitrile prepared from dimerized linoleic acid, 81 grams of adiponitrile, and 25 grams of the copper-chromite catalyst of Example II. After hydrogenation at 270° C. for 2 hours, there was obtained a copolymer product having 6.3% primary amine groups, 49.6% secondary amine groups, 18.1% tertiary amine groups, a Brookfield viscosity of 338 poises at 25° C., and a Brookfield viscosity of 60 poises at 60° C.

EXAMPLE XI

Example I was repeated except that the hydrogenation was carried out at a reaction pressure of 90 p.s.i. for 4 hours at 232 to 248° C. using 10 g. of methanol-wet Raney nickel catalyst. There was obtained a product having 1% primary amine groups, 72.3% secondary amine groups, 6.1% tertiary amine groups, 11.8% nitrile groups, an iodine value of 83.4, and a Brookfield viscosity of 660 poises at 25° C.

EXAMPLE XII

Into a 1 liter stirred autoclave was charged 300 grams of a distilled dimer diamine having a total amine number of 25.1 as compared to theoretical value of 204.2 which was prepared by hydrogenating dimer nitrile of the presence of ammonia, and 12 grams of methanol-wet Raney nickel catalyst. After hydrogenating the mixture for 2 hours using the conditions of Example I, there was obtained a polymeric product having 23.3% primary amine groups, 69.5% secondary amine groups, 4.8% tertiary amine groups, and a Brookfield viscosity of 65.2 poises at 25° C.

EXAMPLE XIII

Into a 1 liter stirred autoclave was charged 68 grams of meta xylylene diamine, 291 grams of the distilled dimer diamine of Example XII, and 10 grams of the copper-chromite catalyst of Example II. After hydrogenating for 1⅔ hours using the reaction conditions of Example I, there was obtained a copolymeric product having an amine number due to secondary amines of 117.8. In comparison, the product of Example XII had an amine number due to secondary amines of 76.6 and the product of Example III had an amine number due to secondary amines of 90.3. The higher amine number for the product of this example indicates a larger weight percent of secondary amine groups due to formation of the copolymer.

FORMATION OF METAL COMPLEXES

In general, it is known that certain metal complexes of nitrogen compounds have heat stability. The instant metal complexes, however, are unusual in that they are very simple, relatively inexpensive and readily obtained from fatty nitrogen derivatives. Heretofore metal complexes of nitrogen compounds were usually solids or gels; whereas the complexes of the instant invention have unusual advantages in handleability and that for the most part they are low viscosity liquids which are generally clear and they have been found to have a very substantial apparent pot life, when kept in sealed containers, which is a definite advantage in the field of heat curable coatings. Also, the complexes of the invention have been found to cure at reasonable times and reasonable temperatures, for example, in about 30 to 45 minutes at 150° C.; but they produce extremely heat stable coatings found to have heat stability in the range of 500° F. to 600° F. for periods up to 1½ hours, in the absence of serious or substantial physical degradation. It will be appreciated that highly conductive films may be used by excessive amounts of metal in the formation of such metal complexes; whereas the use of smaller amounts of metal, while still forming the heat stable infusible films of the invention, appear to result in films having greater extensibilities.

Another particular advantage of the instant initially formed metal complexes is that they possess unusually good solubility in the common "organic" solvents such as butanol, toluene, halogenated hydrocarbons, etc. The complex formation, in the initial soluble form, is readily obtained and readily apparent to the skilled worker, merely by intimately mixing a salt of the metal with the instant polysecondary amines (preferably with an inert compatible solvent) with moderate heating and intimate mixing until a homogeneous system is obtained, thereby indicating the formation of the initial metal complex (in solution in the solvent, if the solvent is used). The resulting complex is readily filmed (and for purposes of assistance in obtaining controlled uniform filming, the solvent is preferably used as a volatile, inert solvent which may contain complex concentrations preferably in the range of about 5 to 50% by weight in order to obtain desirable viscosities and general handleability). The materials are filmed wet by conventional filming techniques and are then subjected to the rather nominal curing conditions (e.g. about 150° C. for 30 to 45 minutes in ambient oxidative atmosphere) to obtain relatively thin, glossy, hard, non-tacky films having the properties hereinbefore described. Preferably relatively thin film thicknesses of 5 mils or less are employed, but greater film thicknesses may be employed and the curing thereof may be facilitated materially by the use of oxidation agents in conjunction with the heat. The mechanics of the curing reaction are not fully understood, but it does seem apparent that they involve the conventional heat-and-oxidation curing procedures of a number of known curable films.

The metal complex formation itself is unusually simple and readily recognized by the homogeneity that is obtained merely by bringing the metal salt and the polysecondary amine into contact with each other (in a generally inert system, otherwise). The metal salts of the cation used in forming the complex are essentially inert metal salts, such as those of comparatively weak inorganic acids, or the salts of the simple organic acid such as acetic acid, propionic, etc., or salts of relatively volatile anionic materials which may escape readily even under moderate heating conditions and thus function as substantially inert by-products. In addition, the salts employed may themselves be Werner complexes of simple ammonia salts, e.g., copper or cadmium ammonium nitrate or carbonates, which result in typical metal complex formation wherein the more volatile anionic as well as the ammonia components are removed during moderate warming and homogeneity is readily obtained. Preferred for use in the practice of the instant invention, however, have been found to be the various acetates of the cations of choice, e.g. cupric, zinc and/or lead acetate. Such materials are ordinarily available as hydrates which are readily soluble in butanol or comparable solvents to facilitate the use thereof in complex formation with the polysecondary amines of the invention.

The resulting complexes (preferably in a reasonably concentrated 10% to 50% organic polar solvent system) have been found to possess unusual stability during storage under sealed conditions to preclude exposure thereof to excessive amounts of ambient atmosphere, oxygen, carbon dioxide, and the like.

EXAMPLE XIV

A charge of 20 grams of 46% butanol-toluene solution of a polysecondary amine with an average molecular weight of 8300, obtained by the previously described procedure of Example I herein, is thoroughly admixed with 1.65 grams of zinc acetate dihydrate. This mixture is warmed gently with stirring until the zinc acetate appears to go into solution, and a substantially homogeneous composition is formed, indicating that the complex has formed. At this point the color of the solution is somewhat milky as contrasted to an initial brownish cast in the color. Films are cast from this solution having a thickness of 3 mils on glass, tin and stainless steel panels; and such panels are maintained in an oven for 30 minutes which has been preheated to 150° C. After removal and cooling the films are found to be hard and non-tacky. Impact resistance tests on the tin panel show the film has a 60% extensibility, and the film also has a B pencil hardness (which is a standard hardness test).

The film cured on the steel panel is tested for heat stability by placing the coated steel panel (after the film has been cured in the manner hereinbefore described) in an oven preheated to 500° F. and retaining the same therein for 1½ hours. Based on a predetermined coating weight of 0.1169 gram, it is found that the percent loss of coating after such exposure in the oven is approximately 8.57%; and the film is found to be darkened after such exposure, although it still retains its excellent adhesion to metal.

It will be appreciated that the films thus initially cured at 150° C. have a high gloss and are found to be infusible and insoluble and found to possess many extremely desirable properties for heat stable coatings, including those just described.

EXAMPLE XV

A charge of 20 grams of the previously described polysecondary amine solution of Example XIV is thoroughly admixed with 3.3 grams of zinc acetate dihydrate, with gentle warming to bring the zinc acetate into solution, and thereby form the zinc complex with the polysecondary amine, in the solution described. The filming and curing procedure of Example XIV is repeated and it is found that the resulting cured films have 60% extensibility and a B pencil hardness.

The steel panel thus coated is placed in an oven preheated to 500° F. and retained therein for 1½ hours, and then the coated panel is removed, cooled and examined; and it is found that the calculated weight loss is only about 5.41% on the basis of 0.1259 gram of film, and the film has retained its adhesion to the steel panel.

It will be appreciated that in the foregoing Examples XIV and XV, the approximate weight ratio of polysecondary amine to metal (in the metal salt) is 20:1 and 10:1, respectively. In general, ratios of polysecondary amine to metal less than about 100:1 or even 50.1 will not possess many of the advantages obtained from the incorporation of metal in the complex formation; whereas weight ratios of polysecondary amine to metal in the more concentrated ranges of 2:1 to 5:1 may have reduced extensibilities which will compensate for additional advantages such as conductivity or the like which may be desired. Preferably, however, the polyamine to metal weight ratio is within the range of about 50:1 to about 5:1.

The relationship between the average molecular weight of the polysecondary amine and the number of mols of metal in the cationic portion of the metal salt molecule is more difficult to correlate, for the reason that the varying molecular weights of the polysecondary amine will necesarily involve varying numbers of electron donor positions at the nitrogen atoms. For example, in the Examples XIV and XV the zinc acetate to polysecondary amine apparent molar ratios range from 100–200:1.

EXAMPLE XVI

A charge of 20 grams of the polysecondary amine solution of Example I is thoroughly mixed with 1.5 grams of cupric acetate monohydrate, with mild warming and mixing until the cupric salt appears to go into solution. The resulting solution becomes blue in color and increases somewhat in viscosity, indicating a formation of the copper complex with the polysecondary amine. Films are cast from the instant solution in 3 mil thicknesses on tin and steel panels and cured by placing the same in an oven preheated to 150° C., for 30 minutes. The films turned brown in color during the curing process, but appeared to possess excellent adherence. Impact resistance tests on the tin panel show that the film possesses a 60% extensibility.

The heat resistance of the instant metal complex was found to be somewhat less satisfactory than the previously described heat resistance of the zinc complexes. For example, the weight loss after a two hour exposure of the coated steel panel in an oven at 500° F. was found to be considerably greater than the previously reported results (i.e. about 25%) and it was noted that the film cracked in certain places during such exposure. It will be appreciated that the film thickness employed herein is 3 mils rather than 1½ mils as previously described, which demonstrates the advisability of using thin films in most instances, at least in the absence of the inclusion of oxidative agents in the filming compositions and/or more prolonged curing times in the initial film cure.

EXAMPLE XVII

A charge of 30 grams of a 31% butanol-toluene solution of the polysecondary amine described in Example XIV hereof is thoroughly admixed with 2.44 grams of lead acetate and the mixture is warmed gently until all of the lead acetate goes into solution. Films of 3 mils thickness are cast from this solution on tin panels and cured for 45 minutes in an oven preheated to 150° C. The cured film is found to have 60% extensibility, which is very good for heat stable films of this character.

EXAMPLE XVIII

The procedure of Example XIV may be repeated using equivalent quantities of any of the polysecondary amines described in Examples I through XIII, in 40% butanol-toluene solutions, and the complex formation takes place with comparable facility. Thin films in the order of 1 to 2 mils thickness resulting from the complex solution thus formed are curable in each case at 150° C., during substantially a 45 minute cure to obtain films having high gloss and good heat stability and solvent insolubility.

The procedure of the instant example is repeated with comparable results employing other metal salts, having a metal content substantially comparable to the zinc metal content hereinbefore described, using such other metal salts as cobaltous acetate, nickelous-acetate, ferrous acetate, cadmium acetate, and any of the other Group I–B, II–B and VIII–B (transition metal) salts; in addition comparable results are obtained using rare earth metal salts such as ceric ammonium nitrate, $(NH_4)_2Ce(NO_3)_6$, and cerous acetate, which are available in substantially pure form and in the crude or technical grade which includes the corresponding rare earth salts of lanthanum, neodymium, praseodymium, terbium, yttrium and samarium. Preferably, the hereinbefore amphoteric polyvalent metal salts and other such as aluminum acetate, the acetates of bismuth, antimony, manganous and chromium, titanium and/or vanadium ammonium carbonates, etc. may all be used in corresponding amounts on the basis of the ratio of polysecondary amine to metal weight.

The metal complexes thus formed have applicability in the field of liquid ion exchange and corrosion inhibition at high temperatures, as well as specific characteristics typical of salts or complexes of certain of the individual metals.

It will be noted that the more difficulty soluble metal salts of ammonium complexes are set forth hereinbefore and these include such materials as titanium ammonium carbonate and the rare earth ammonium nitrates, which are, in fact, metal complexes in their own right, but by the use of controlled conditions using e.g. butanol as the common solvent, complexes of these metals with the polysecondary amines are obtained. The mechanism is believed to involve preferably divalent tetracoordinate metal ions which include Mn, Fe, Co, Ni, Cu, Mg, Zn and Be (all available as acetates, chlorides and/or acetylacetonates) in a chelation-type complex formation; and complexes of each using the corresponding salt are obtained in the procedure of Example XVII.

THEORY OF METAL COMPLEX FORMATION

The formation of metal complexes of organic compounds, and specifically nitrogen compounds, has been studied to some extent and some generalizations have been attempted on the theoretical bases of chelation (Chelation, vol. 3, p. 17, McGraw-Hill Encyclopedia of Science and Technology, 1960). In such complex formation, practically all metal cations are found to form coordinate bonds with at least some functional organic groups, such bonds presumably being formed by the free electron pair of a donor atom (i.e. the point of attachment) of the "ligand" or chelating agent or group. If the ligand has two such points of attachment it is called a "bidentate" ligand; and with three such points, a "tridentate" ligand; etc.

In general, nitrogen, oxygen and sulfur (and sometimes phosphorous) are understood to serve as the electron donor atoms in the majority of chelating agents. The complex forming compounds of the present invention are organic nitrogen-containing compounds (or ligands). The cations preferred for complex formation in the practice of the invention include polyvalent $Zn^{+2}$, $Cu^{+2}$, $Cd^{2+}$, $Co^{3+}$, $Ni^{2+}$, $Hg^{+2}$, $V^{3+}$ (as well as monovalent $Cu^+$, $Ag^+$ and $Au^+$) all of which have exhibited a distinct preference for nitrogen as the donor atom. Other polyvalent metal cations preferred include $Cr^{3+}$, $Fe^{3+}$ and the transition metals generally, which as a group show preference for coordination through nitrogen rather than oxygen. The invention, however, also contemplates complex formation with other metal cations which are more often known to chelate with ligands containing at least one oxygen donor atom, such polyvalent cations including Be$^{+2}$, Mg$^{+2}$, Ca$^{+2}$, Sr$^{+2}$, Ba$^{+2}$ (of Group II–A); Al$^{+3}$, Ga$^{+3}$, In$^{+3}$, Te$^{+3}$ (of Group III–A); Group III–B cations, the rare earth (e.g. Ce and Th) and actinide series; Group IV–A metals such as Sn$^{4+}$, Ge$^{4+}$ and Pb$^{4+}$; Group IV–B metals, such as Ti$^{+4}$ and Zr$^{+4}$. Also, capable of coordination with nitrogen and, therefore, contemplated for use in the formation of metal complexes of the invention are Group V–B cations such as V, Nb and Ta; Group VI–B cations such as Mo and Cr; Mn (of Group VII–B); and the Group VIII–B transition metals of which Fe, Co and Ni are preferred. The cations of Groups I–B and II–B, plus such transition metal cations of Group VIII–B, have already been indicated as being preferred for use in the invention.

The general knowledge of the art has indicated that a Werner complex-forming chelating agent must be at least bidentate or polydentate (which is the case of the compounds of the invention); and, although it has been recognized that the polydentate may coordinate with different cations which would thus link polydentates together in polymer-type structure, most of the studies by workers in the art have been devoted to chelation of a cation by coordination with at least two points of attachment in a given polydentate to effect ring closure in a heterocyclic ring containing a "nuclear" cation. Most common among these are 5- and 6-membered rings, whose heat-stability has been studied primarily on the basis of retaining the specific ring in its initial chelated form. Thus, remarkable heat stability is attributed to the copper phthalocyanin complex which is stable (presumably as such) in the vapor phase near 500° C. Although 7-, 8- and even larger membered rings were believed to form in certain instances, their lack of stability was recognized.

In 1956, Marvel et al. (J. Amer. Chem. Soc., vol 78, 4905) generalized that sexadentates were less stable than quadridentates, in comparing Schiff's bases of hydroxy aryl aldehydes and diprimary amines (to form the quadridentates) and diprimary disecondary amines (to form the sexadentates). In 1961, Goodwin and Bailar (J. Amer. Chem. Soc., vol. 83, 2467) added a note of confusion to the field by indicating that the trends suggested by Marvel and other prior workers did not follow, in certain instances. In addition, these studies, in so far as they related to N compounds, always seem to involve the presence of an oxygen donor (in the hydroxy aryl group) and very short (C$_2$) linkages between secondary amino N atoms (as in poly ethylene poly amine groups) neither of which are characteristics of the ligand structures of the invention. Moreover, the stability results reports were inconclusive.

In 1962, Johns and DiPietro (J. Org. Chem., vol. 27 592) reported some unusual heat stabilities in the entirely different systems involving solid metal complexes of tris-(2-hydroxyphenyl)-triazines (which they described as probably involving a combination of O and N donor coordinate bonds with a polyvalent cation, e.g. Cu$^{+2}$, Be$^{+2}$ and Zn$^{+2}$) which they formed as infusible solids resulting directly from interaction of the triazine chelating agent and a solution of the cation salt.

The foregoing serves to indicate a knowledge of some general principles in this art (namely, that practically all metal cations will form complexes with N-compounds, but few of such complexes have heat stability), but no conclusive evidence has been shown as to stability trends in connection with polydentate ligands consisting essentially of only N donor groups, as in the case of the instant polysecondary amines. The instant polysecondary amines coordinate readily with the cations hereinbefore specified; but they form an initial liquid complex of superior stability and solubility under conventional storage conditions, which complex may thus be filmed or otherwise conveniently handled in useful condition such as a solution adapted to film on a substrate before conversion to the highly heat-stable infusible, insoluble, adherence film ultimately obtained. The initial or final complex stability can hardly be explained on the conventional basis of chelation ring closure, e.g., between the secondary amine N atoms in the present system, as in $$-\underset{\underset{Me}{\diagdown\diagup}}{N}\overset{CH_2-R-CH_2}{\underset{}{N}}- \qquad (R-I)$$

because the R radical herein would presumably be so large as to create a wholly unstable ring with a nuclear carton (Me). In the instant polysecondary amines, it will be understood that a terminal primary amino group could also function with the immediately adjacent secondary amino group to form essentially the same ring structure (R–I). Combinations of fused (R–I) rings appear impossible or improbable. Moreover, the Goodwin article seems to indicate that satisfaction of all the coordinate cation valences is important, which, of course, is not possible in the ring (R–I) hereof. Nevertheless, the complex does form and in a uniquely advantageous form for handling in solution, and later for conversion to the infusible film form.

Although the art has advanced to the stage where the (Werner) complex formation per se may be readily recognized primarily by observation of the formation of a homogeneous system when, as in the present case, the metal salt and the organic nitrogen compound of the invention are intimately admixed (usually with mild warming), the exact molecular structure of the present metal complexes, either before or after conversion to the insoluble infusible film form, has not yet been determined; and the storage stability and solubility of the liquid form, as well as the heat-stability, infusibility, insolubility and adherence to the substrate of the cured film forms, have not been explained on the basis of any specific theory of molecular structure.

It will be understood that modifications and variations may be effected without departing from the spirit and scope of the novel concepts of the present invention.

I claim as my invention:

1. As a new substance, a metal complex of a polysecondary amine compound having the general formula:

$$H-[-N-CH_2-R-CH_2-]_x-NH_2$$
$$\phantom{H-[-}|$$
$$\phantom{H-[-}H$$

wherein $x$ is an integer from 2 to 40 and R is a dimeric fat radical; the radical R containing at least 16 carbon atoms; the weight ratio of metal to the remainder of the complex being substantially 1:2 to 1:50.

2. As a new substance, a metal complex of a polymer having the recurring structural unit:

$$[-N-CH_2-R-CH_2-]$$
$$|$$
$$H$$

wherein R is a dimeric fat radical; the radical R containing at least 16 carbon atoms; the weight ratio of metal to the remainder of the complex being substantially 1:2 to 1:50.

3. As a new substance, a metal complex of a compound having the general formula:

$$H-[-N-CH_2-R-CH_2-]_x-NH_2$$
$$\phantom{H-[-}|$$
$$\phantom{H-[-}H$$

wherein $x$ is an integer from 2 to 40 and R is a dimeric fat radical of dimerized linoleic acid; the radical R containing at least 16 carbon atoms; the weight ratio of metal to the remainder of the complex being substantially 1:2 to 1:50.

4. As a new substance, a liquid polyvalent metal complex of a polysecondary amine polymeric condensation product of an aliphatic diprimary diamine wherein the aliphatic group is a dimeric fat radical R; the radical R containing at least 16 carbon atoms; the weight ratio of such polyvalent metal in the complex to such condensation product being substantially 1:2 to 1:50.

5. As a new substance, a liquid polyvalent metal complex of a copolymeric condensation product of an aliphatic diprimary diamine wherein the aliphatic group is a dimeric fat radical R and a copolymerizable aliphatic diamine; the radical R containing at least 16 carbon atoms; the weight ratio of such polyvalent metal in the complex to such condensation product being substantially 1:2 to 1:50.

6. As a new substance, a liquid polyvalent metal complex of a polysecondary amine polymeric condensation product of an aliphatic diprimary diamine wherein the aliphatic group is a dimeric fat radical R of dimerized linoleic acid; the radical R containing at least 16 carbon atoms; the weight ratio of such polyvalent metal in the complex to such condensation product being substantially 1:2 to 1:50.

7. As a new substance, a liquid polyvalent metal complex of a polysecondary amine copolymeric condensation product of meta xylylene diamine and an aliphatic diprimary diamine wherein the aliphatic group is a dimeric fat radical R of dimerized linoleic acid; the radical R containing at least 16 carbon atoms; the weight ratio of such metal to such condensation product being substantially 1:2 to 1:50.

8. As a new substance, a liquid polyvalent metal complex of a copolymer having randomly distributed recurring units:

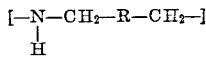

and

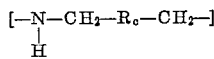

wherein R is a dimeric fat radical and $R_c$ is a dimeric aliphatic chain; the radical R containing at least 16 carbon atoms; the weight ratio of metal to the remainder of the complex being substantially 1:2 to 1:50.

9. As a new composition, a liquid solution, in an inert volatile solvent, of a metal complex of a polysecondary amine compound having the general formula:

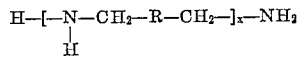

wherein $x$ is an integer from 2 to 40 and R is a dimeric fat radical; the radical R containing at least 16 carbon atoms; the weight ratio of metal to the remainder of the complex being substantially 1:2 to 1:50.

10. As a new composition, a metal complex of a polymer having the recurring structural unit:

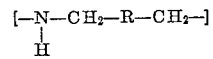

wherein R is a dimeric fat radical, dissolved in an inert volatile solvent therefor; the radical R containing at least 16 carbon atoms; the weight ratio of metal to the remainder of the complex being substantially 1:2 to 1:50.

11. A liquid composition whose hardenable components comprise a liquid polyvalent metal complex of a polymer having the recurring structural unit:

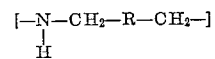

wherein R is a dimeric fat radical; the radical R containing at least 16 carbon atoms; the weight ratio of metal to the remainder of the complex being substantially 1:2 to 1:50.

12. A liquid coating composition consisting essentially of a heat-hardenable liquid polyvalent metal complex of a polymer having the recurring structural unit:

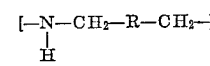

wherein R is a dimeric fat radical, said complex being dissolved in an inert volatile organic solvent; the radical R containing at least 16 carbon atoms; the weight ratio of metal to the remainder of the complex being substantially 1:2 to 1:50.

13. An infusible insoluble resinous composition formed by heat-curing a composition whose hardenable components comprise a liquid metal complex of a polymer having the recurring structural unit:

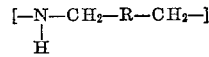

wherein R is a dimeric fat radical; the radical R containing at least 16 carbon atoms; the weight ratio of metal to the remainder of the complex being substantially 1:2 to 1:50.

14. As a new substance, a transition metal complex of a polymer having the recurring structural unit:

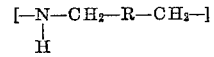

wherein R is a dimeric fat radical; the radical R containing at least 16 carbon atoms; the weight ratio of metal to the remainder of the complex being substantially 1:2 to 1:50.

15. As a new substance, a polyvalent metal complex of a compound having the general formula:

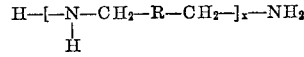

wherein $x$ is an integer from 2 to 40 and R is a dimeric fat radical; the radical R containing at least 16 carbon atoms; the weight ratio of metal to the remainder of the complex being substantially 1:2 to 1:50.

16. As a new substance, a polyvalent amphoteric metal complex of a compound having the general formula:

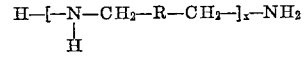

wherein $x$ is an integer from 2 to 40 and R is a dimeric fat radical; the radical R containing at least 16 carbon atoms; the weight ratio of metal to the remainder of the complex being substantially 1:2 to 1:50.

17. As a new substance, a transition metal complex of a compound having the general formula:

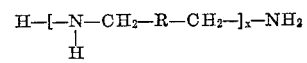

wherein $x$ is an integer from 2 to 40 and R is a dimeric fat radical; the radical R containing at least 16 carbon atoms; the weight ratio of metal to the remainder of the complex being substantially 1:2 to 1:50.

18. A process of producing an infusible insoluble film, that comprises filming a composition whose hardenable component comprises a metal complex of a polymer having the recurring structural unit:

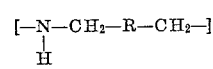

wherein R is a dimeric fat radical, and curing the film by heating; the radical R containing at least 16 carbon atoms; the weight ratio of metal to the remainder of the complex being substantially 1:2 to 1:50.

19. A process of producing an infusible insoluble film, that comprises filming a composition consisting essentially of a heat-hardenable liquid polyvalent metal complex of a compound having the general formula:

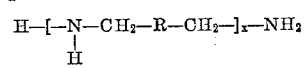

wherein $x$ is an integer from 2 to 40 and R is a dimeric fat radical, said complex being dissolved in a volatile inert solvent therefor, and curing such film by heating in the presence of ambient atmosphere to volatilize the solvent; the radical R containing at least 16 carbon atoms;

the weight ratio of metal to the remainder of the complex being substantially 1:2 to 1:50.

20. An infusible insoluble heat-cured film whose hardened component consists essentially of a metal complex of a polymer having the recurring structural unit:

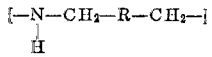

wherein R is a dimeric fat radical; the radical R containing at least 16 carbon atoms; the weight ratio of metal to the remainder of the complex being substantially 1:2 to 1:50.

21. An infusible insoluble thin heat-resistant film that consists essentially of a heat-and-oxidation-cured polyvalent metal complex of a compound having the general formula:

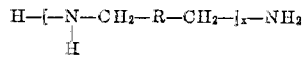

wherein $x$ is an integer from 2 to 40 and R is a dimeric fat radical; the radical R containing at least 16 carbon atoms; the weight ratio of metal to the remainder of the complex being substantially 1:2 to 1:50.

References Cited

UNITED STATES PATENTS

| | | | |
|---|---|---|---|
| 2,366,129 | 12/1944 | Rust | 260—2 |
| 3,038,904 | 6/1962 | Godfrey | 260—439 |
| 3,214,466 | 10/1965 | Green et al. | 260—2 |
| 3,217,028 | 11/1965 | Vertnik | 260—465.5 |

JOSEPH L. SCHOFER, *Primary Examiner.*

L. G. CHILDERS, J. KIGHT, *Assistant Examiners.*